(12) United States Patent
Kyung et al.

(10) Patent No.: US 10,325,530 B2
(45) Date of Patent: Jun. 18, 2019

(54) DISPLAY DEVICE AND CONTROLLING METHOD FOR CURVATURE OF THE SAME

(71) Applicants: Samsung Display Co., Ltd, Yongin-si, Gyeonggi-do (KR); UNIST(ULSAN NATIONAL INSTITUTE OF SCIENCE AND TECHNOLOGY), Ulsan (KR)

(72) Inventors: Gyouhyung Kyung, Ulsan (KR); Ja Eun Lee, Suwon-si (KR); Mu Gyeom Kim, Hwaseong-si (KR); Seung Bae Lee, Seoul (KR); Byeong Hwa Choi, Seoul (KR); Sungryul Park, Ulsan (KR); Songil Lee, Ulsan (KR); Jihhyeon Yi, Ulsan (KR); Donghee Choi, Ulsan (KR); Kyung Hyun Nam, Yongin-si (KR)

(73) Assignee: ULSAN NATIONAL INSTITUTE OF SCIENCE AND TECHNOLOGY (KR)

( * ) Notice: Subject to any disclaimer, the term of this patent is extended or adjusted under 35 U.S.C. 154(b) by 130 days.

(21) Appl. No.: 15/409,393

(22) Filed: Jan. 18, 2017

(65) Prior Publication Data
US 2017/0215272 A1 Jul. 27, 2017

(30) Foreign Application Priority Data
Jan. 21, 2016 (KR) .......................... 10-2016-0007567

(51) Int. Cl.
*G06F 1/16* (2006.01)
*G09F 9/30* (2006.01)

(52) U.S. Cl.
CPC ............ *G09F 9/301* (2013.01); *G06F 1/1652* (2013.01)

(58) Field of Classification Search
CPC ................ H04M 1/0268; G06F 1/1652; G06F 2203/04102; G09G 2380/02
See application file for complete search history.

(56) References Cited

U.S. PATENT DOCUMENTS

| 2014/0354791 A1 | 12/2014 | Lee et al. |
| 2015/0035812 A1 | 2/2015 | Shin et al. |
| 2015/0195926 A1* | 7/2015 | Kandur Raja ........ G06F 1/1605 348/373 |

FOREIGN PATENT DOCUMENTS

| JP | 2009-049934 A | 3/2009 |
| KR | 10-2013-0050794 A | 5/2013 |
| KR | 10-2013-0092868 A | 8/2013 |
| KR | 10-2014-0141302 A | 12/2014 |
| KR | 10-2015-0086728 A | 7/2015 |

* cited by examiner

*Primary Examiner* — Thanh Luu
(74) *Attorney, Agent, or Firm* — Innovation Counsel LLP

(57) ABSTRACT

A method for controlling a curvature of a display device as a control method of the curvature of the display device including a flexible display panel, a curvature change member, a controller, and a photo sensor includes: measuring an amount of a light incident to the flexible display panel by using a photo sensor; confirming a position of a part where the amount of the measured light is more than a predetermined reference value in the flexible display panel when the amount of the measured light is more than the reference value; and changing the curvature around the part where the amount of the measured light is more than the reference value in the flexible display panel by using the curvature change member.

3 Claims, 16 Drawing Sheets

DISPLAY DEVICE AND CONTROLLING METHOD FOR CURVATURE OF THE SAME

CROSS-REFERENCE TO RELATED APPLICATION

This application claims priority to and the benefit of Korean Patent Application No. 10-2016-0007567 filed in the Korean Intellectual Property Office on Jan. 21, 2016, the entire contents of which are incorporated herein by reference.

BACKGROUND (a) Technical Field

The present application relates to a display device and a method for controlling a curvature thereof.

(b) Description of the Related Art

A display device as a device displaying an image may use a liquid crystal display (LCD), an organic light emitting diode (OLED) display, and an electrophoretic display.

Among these display devices, a flexible display device that is thin and easily flexible has recently been spotlighted.

The flexible display device may be bent to be concave or convex depending on a requirement of a user. Also, the flexible display device may be rolled for being portable and easily stored.

When bending the flexible display device, a curvature of the flexible display device may be controlled to be bent for the purpose corresponding to a user's desire.

The above information disclosed in this Background section is only for enhancement of understanding of the background and therefore it may contain information that does not form the prior art that is already known in this country to a person of ordinary skill in the art.

SUMMARY

Embodiments provide a method for controlling a curvature of a display device by using a curvature change member.

A method for controlling a curvature of a display device according to an exemplary embodiment as a control method of the curvature of the display device including a flexible display panel, a curvature change member, a controller, and a photo sensor includes: measuring an amount of light incident to the flexible display panel by using a photo sensor; confirming a position of a part where the amount of the measured light is more than a predetermined reference value in the flexible display panel when the amount of the measured light is more than the reference value; and changing the curvature around the part where the amount of the measured light is more than the reference value in the flexible display panel by using the curvature change member.

The confirming the position of the part where the amount of the light is more than the reference value may include capturing a screen displayed in the flexible display panel by using a camera including in the display device to find a brightest part.

The curvature change member may be positioned under the flexible display panel, and contraction and elongation of the curvature change member may be controlled in the controller.

The curvature change member may be in plural, and the controller may control each contraction and each elongation of the plurality of curvature change members.

A method for controlling a curvature of a display device according to another exemplary embodiment as a control method of the curvature of the display device including a flexible display panel, a curvature change member, a controller, and an acceleration sensor includes: measuring acceleration of the display device by using an acceleration sensor; measuring an acceleration direction of the display device when the measured acceleration of the display device is larger than 0.9 G and is smaller than 1.1 G; and changing the curvature of the flexible display panel by using the curvature change member if the acceleration direction of the display device is constant during a predetermined time.

A method for controlling a curvature of a display device according to another exemplary embodiment as a control method of the curvature of the display device including a flexible display panel, a curvature change member, and a controller includes: confirming whether a battery of the display device is charging; confirming a charged amount if the battery of the display device is charging; and changing the curvature of the flexible display panel into the curvature corresponding to the charged amount by using the curvature change member.

A display device according to an exemplary embodiment includes: a flexible display panel; a curvature change member layer positioned under the flexible display panel; and a controller and a sensor unit positioned under the curvature change member layer, wherein the controller applies a voltage to the curvature change member layer to control contraction or elongation of the curvature change member layer.

The curvature change member layer may include a plurality of curvature change members.

The plurality of curvature change members may include an ionic electroactive polymer or an artificial muscle including an electroactive polymer.

The plurality of curvature change members may be arranged in a matrix shape.

The sensor unit may include a photo sensor and an acceleration sensor.

The control method of the curvature of the display device according to an exemplary embodiment may control the curvature of the display device.

DETAILED DESCRIPTION OF THE EMBODIMENTS

Figure 1A:
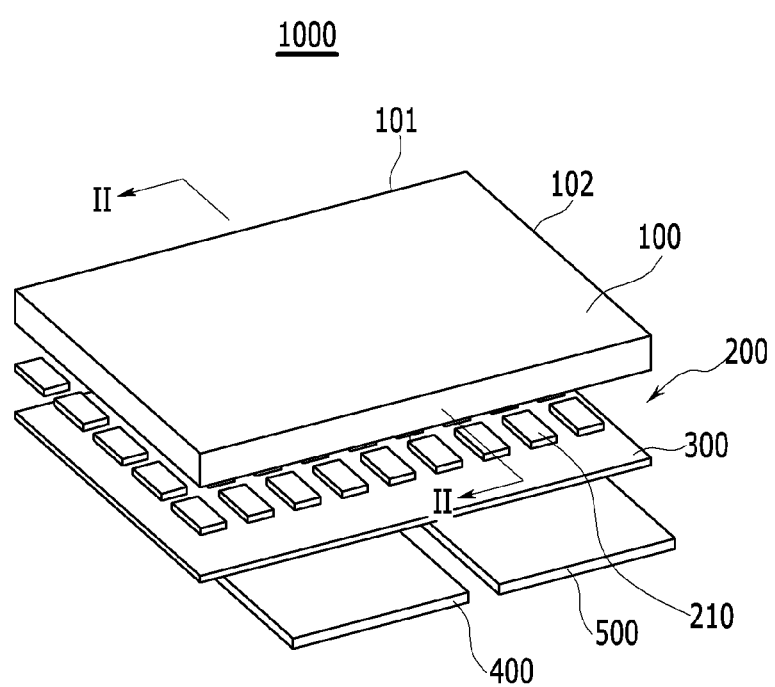
FIG. 1A is a schematic view showing one example of a display device according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In order to clearly explain the inventive concept, portions that are not directly related to the inventive concept are omitted, and the same reference numerals are attached to the same or similar constituent elements through the entire specification.

In addition, the size and thickness of each configuration shown in the drawings are arbitrarily shown for better understanding and ease of description, but the embodiments are not limited thereto.

In the drawings, the thickness of layers, films, panels, regions, etc., are exaggerated for clarity. In the drawings, for better understanding and ease of description, the thicknesses of some layers and areas are exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Further, in the specification, the word "on" means positioning on or below the object portion, but does not essentially mean positioning on the upper side of the object portion based on a gravity direction.

Further, in the specification, the phrase "on a plane" means viewing the object portion from the top, and the phrase "on a cross-section" means viewing a cross-section of which the object portion is vertically cut from the side.

Now, a display device according to an exemplary embodiment will be described with reference to FIG. 1A, FIG. 1B, FIG. 2, and FIG. 3.

Figure 1B:
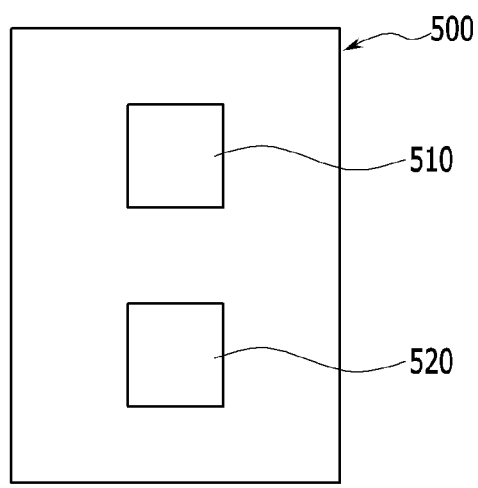
FIG. 1B is a schematic view showing a sensor unit of the display device shown in FIG. 1A.
Figure 2:
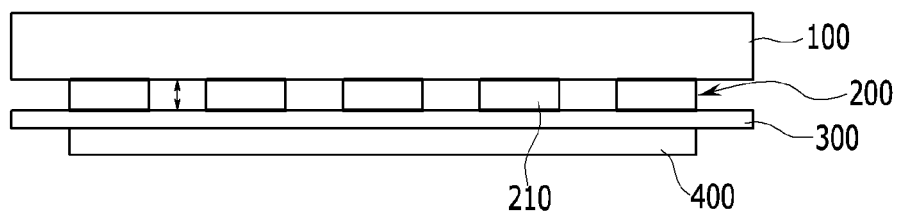
FIG. 2 is a cross-sectional view taken along a line II-II of FIG. 1A in a combined state of the display device shown in FIG. 1A.
Figure 3:
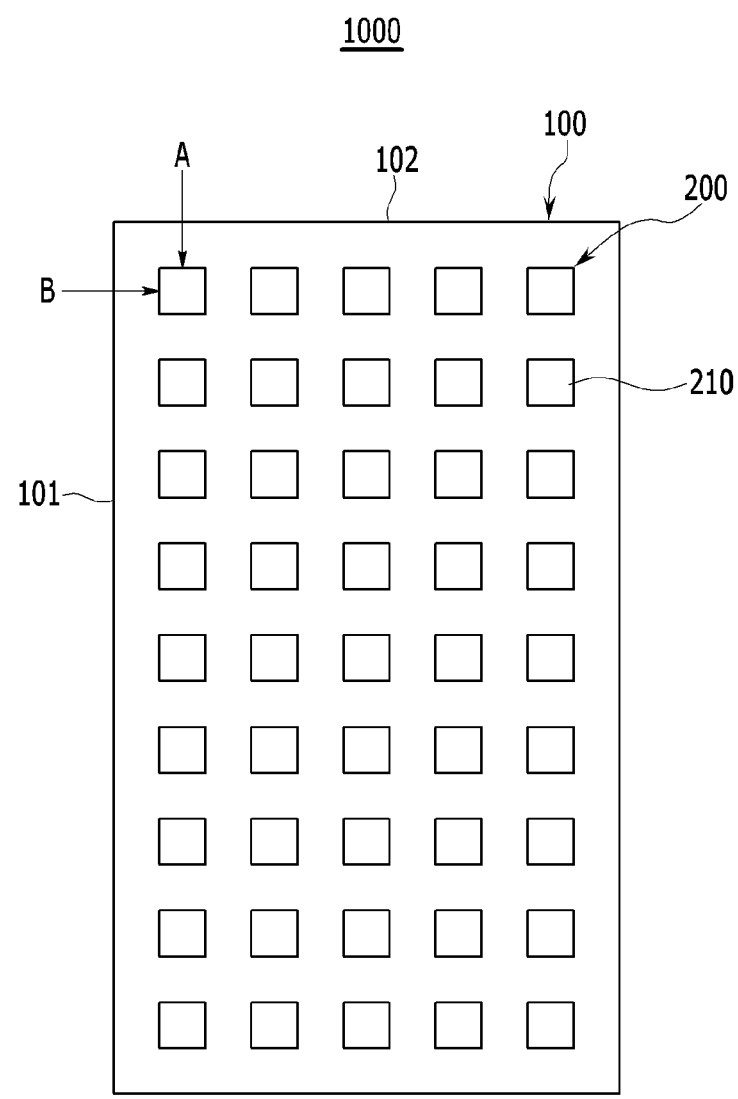
FIG. 3 is a schematic view showing an arrangement of a curvature change members of the display device shown in FIG. 1A.

FIG. 1A is a schematic view showing one example of a display device 1000 according to an exemplary embodiment. FIG. 1B is a schematic view showing a sensor unit of the display device shown in FIG. 1A. FIG. 2 is a cross-sectional view taken along a line II-II of FIG. 1A in a combined state of the display device 1000 shown in FIG. 1A. FIG. 3 is a schematic view showing an arrangement of a curvature change members 210 of the display device shown in FIG. 1A.

Referring to FIGS. 1A, 1B, 2 and 3 together, the display device 1000 according to the present exemplary embodiment includes a flexible display panel 100, a curvature change member layer 200, a supporting member 300, a controller 400, and a sensor unit 500.

The flexible display panel 100 displays an image realized in the display device 1000, and includes a pair of long edges 101 and a pair of short edges 102. For example, when the display device 1000 is a mobile terminal such as a mobile phone, the display device 1000 may display images of a user interface (UI) or a graphical user interface (GUI) associated with a call.

The flexible display panel 100 may include a flexible substrate made of plastic materials having excellent heat resistance and durability such as polyethylene naphthalate (PEN), polycarbonate (PC), polyarylate (PAR), polyether imide (PEI), polyether sulfone (PES), polyimide (PI), and the like. Also, it is not limited thereto, and the flexible display panel 100 may include a flexible substrate made of various materials having flexibility.

Meanwhile, the flexible display panel 100 may include a flexible substrate in which a plurality of thin film transistors, gate lines, data lines, and pixel electrodes are disposed, a flexible substrate in which a color filter and a common electrode are disposed, and a liquid crystal layer interposed between two substrates.

As another example, the flexible display panel 100 may include a plurality of thin film transistors, gate lines, data lines, and organic light emitting diodes disposed on the flexible substrate.

A touch sensor or a touch panel which has a form of a touch film, a touch sheet, a touch pad, and the like and senses a touch operation may be disposed on the upper portion of the flexible display panel 100. Herein, when the touch panel is disposed, the touch panel may also include the flexible substrate.

The curvature change member layer 200 is positioned under the flexible display panel 100 and changes the curvature of the flexible display panel 100.

The curvature change member layer 200 includes a plurality of curvature change members 210. The plurality of curvature change members 210 are arranged in a matrix shape along a first direction A that is a direction parallel to an extending direction of the long edges 101 of the flexible display panel 100 and a second direction B that is a direction parallel to an extending direction of the short edges 102 of the flexible display panel 100.

The curvature change member 210 may be an ionic electroactive polymer that may be contracted or elongated by receiving a voltage, or an artificial muscle such as an electroactive polymer. However, it is not limited thereto, and the curvature change member 210 may be a thermal deformation member that may be deformed by heat, a motor, or a shape memory alloy.

The supporting member 300 is positioned under the curvature change member layer 200 and has a function of supporting the curvature change member layer 200.

The controller 400 and the sensor unit 500 are disposed under the supporting member 300.

The controller 400 controls the curvature change member layer 200. The controller 400 may apply the voltage to the curvature change member 210 for contracting and elongating the curvature change member 210. Here, the contraction and the elongation of the curvature change member 210 is applied in a direction perpendicular to a plane of the flexible display panel 100 (referring to an arrow direction of FIG. 2). A force is applied to the flexible display panel 100 by the contraction and the elongation of the curvature change member 210, thereby changing the curvature of the flexible display panel 100.

The controller 400 may control the contraction and the elongation of each curvature change member 210. That is, the controller 400 may control each contraction and elongation of the plurality of curvature change members 210 to variously change the curvature of the flexible display panel 100. Also, the controller 400 may bend the flexible display panel 100 based on an axis parallel to the first direction A or the second direction B by contracting or elongating the curvature change members 210 of the part positioned along with the first direction A or the second direction B among the plurality of curvature change members 210.

The sensor unit 500 includes a photo sensor 510 and an acceleration sensor 520.

The photo sensor 510 senses the amount of light incident to the flexible display panel 100. If it is sensed that the amount of the light incident to the flexible display panel 100 is more than the reference value, a position of a part where the amount of incident light is more than the reference value is identified to contract or elongate the curvature change member 210 positioned around the part where the amount of incident light is more than the reference value among the flexible display panel 100. Accordingly, among the flexible display panel 100, the periphery of the part where the amount of incident light is more than the reference value is bent, thereby the amount of the light is reduced by the bent part or an incident angle of incident light is changed such that glare of a consumer caused by the incident light is prevented.

The acceleration sensor 520 measures acceleration of the display device 1000. When a free fall of the display device 1000 occurs, by measuring the acceleration of the display device 1000, if the acceleration of the display device 1000 is close to gravitational acceleration, the flexible display panel 100 is entirely bent by contracting or elongating the curvature change member 210, thereby mitigating an impact.

As described above, the curvature change member layer 200 is disposed under the flexible display panel 100 and the curvature change member 210 included in the curvature change member layer 200 is contracted or elongated, thereby variously changing the curvature of the flexible display panel 100.

Next, a curvature change of the flexible display panel 1000 according to the contraction or the elongation of the curvature change member 210 will be described with reference to FIG. 4 to FIG. 6.

Figure 4:
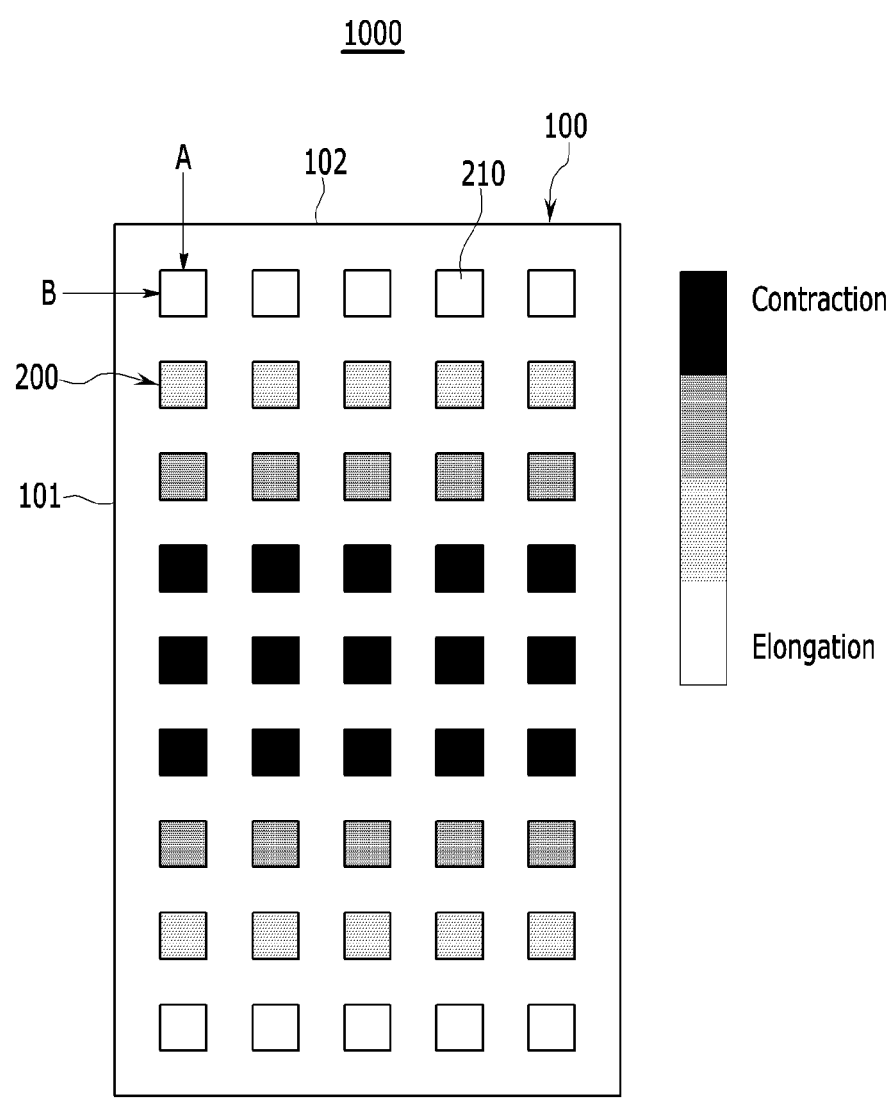
FIGS. 4, 5, 6 are views showing a degree of contraction or elongation of a curvature change member.
Figure 5:
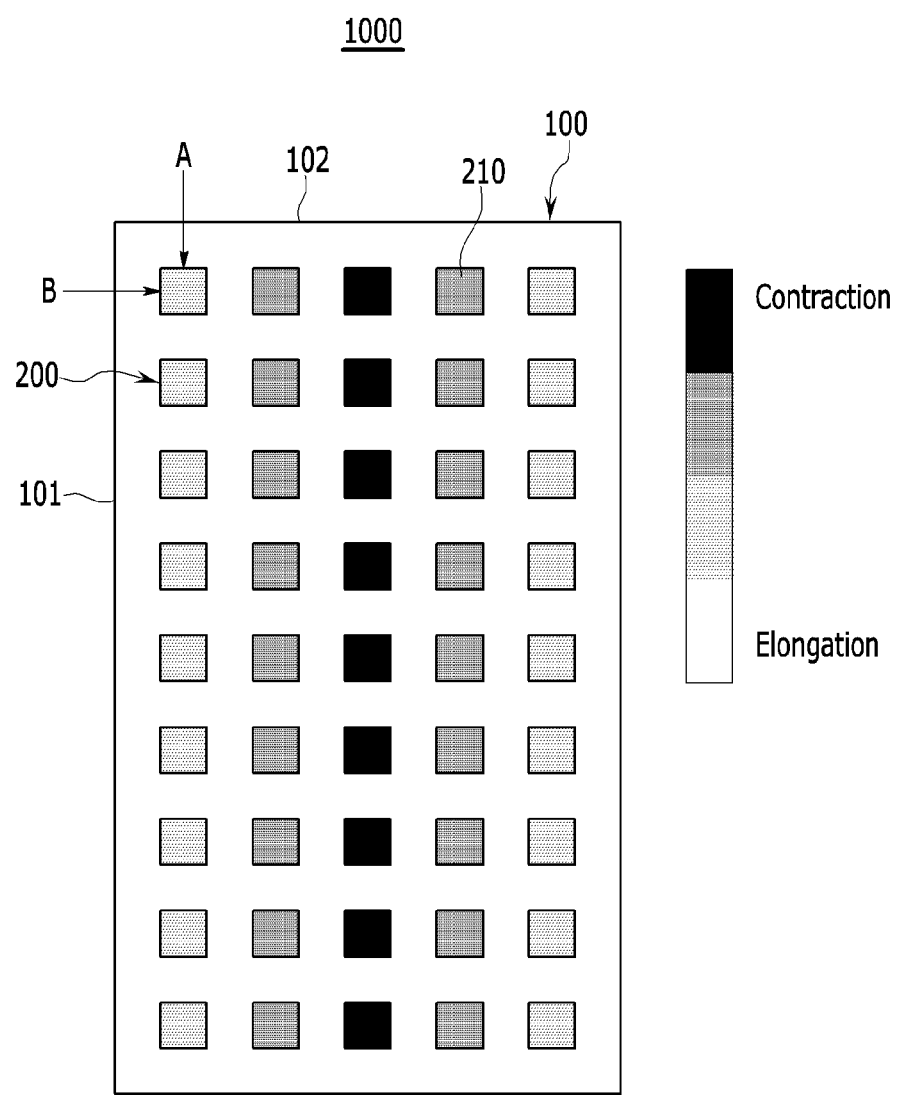
Figure 6:
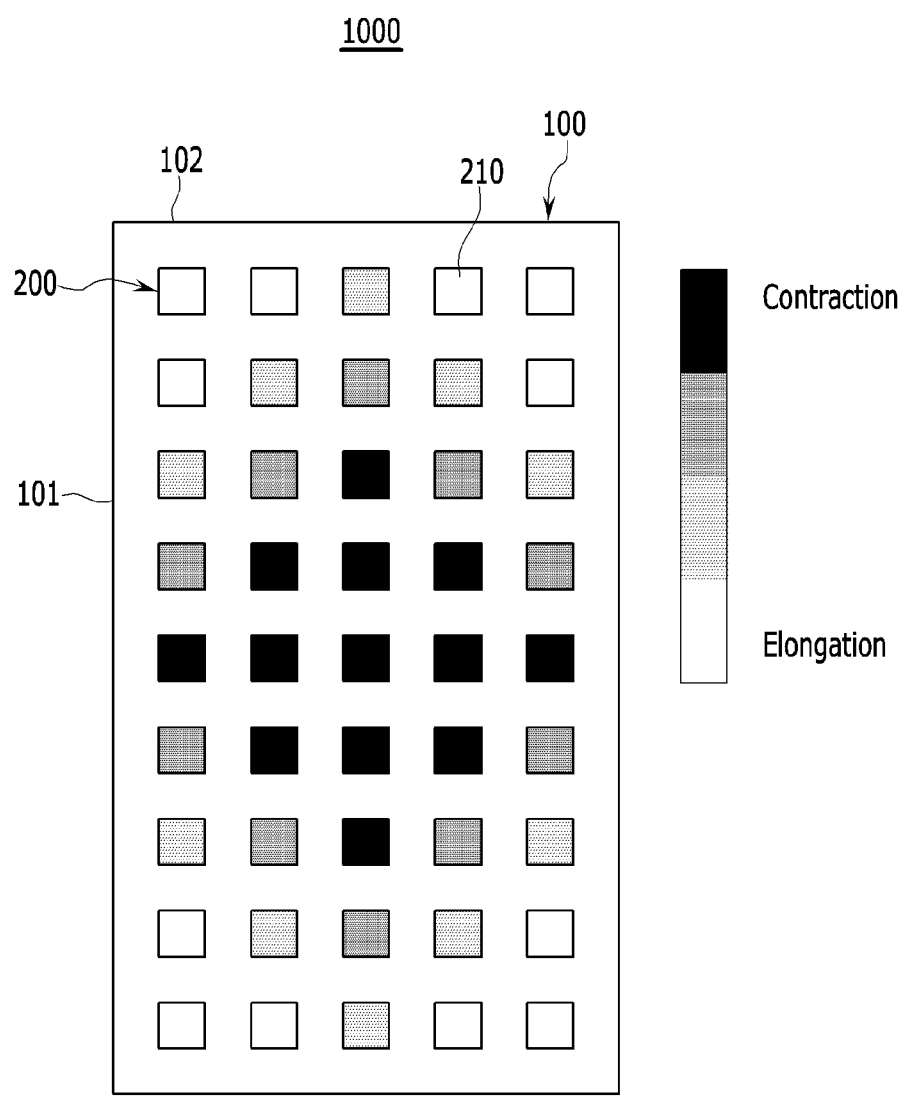

FIG. 4 to FIG. 6 are views showing a degree of contraction or elongation of curvature change members 210.

As shown in FIG. 4, if the curvature change member 210 disposed to the side of the short edge 102 of the flexible display panel 100 is elongated and contraction strength of the curvature change member 210 is increased toward the center part of the flexible display panel 100, the flexible display panel 100 may be bent based on the axis parallel to the second direction B.

As shown in FIG. 5, if the contraction strength of the curvature change member 210 is increased from the long edge 101 of the flexible display panel 100 toward the center part of the flexible display panel 100, the flexible display panel 100 may be bent based on the axis parallel to the first direction A.

As shown in FIG. 6, if the contraction strength of the curvature change member 210 is increased from the center part of the flexible display panel 100 toward an outer part in a concentric direction, the center part of the flexible display panel 100 may be bent in a concave shape.

Meanwhile, the curvature change members 210 may be disposed in various shapes that are not the matrix shape.

A curvature change member of another shape that is not the matrix shape will be described with reference to FIG. 7.

Figure 7:
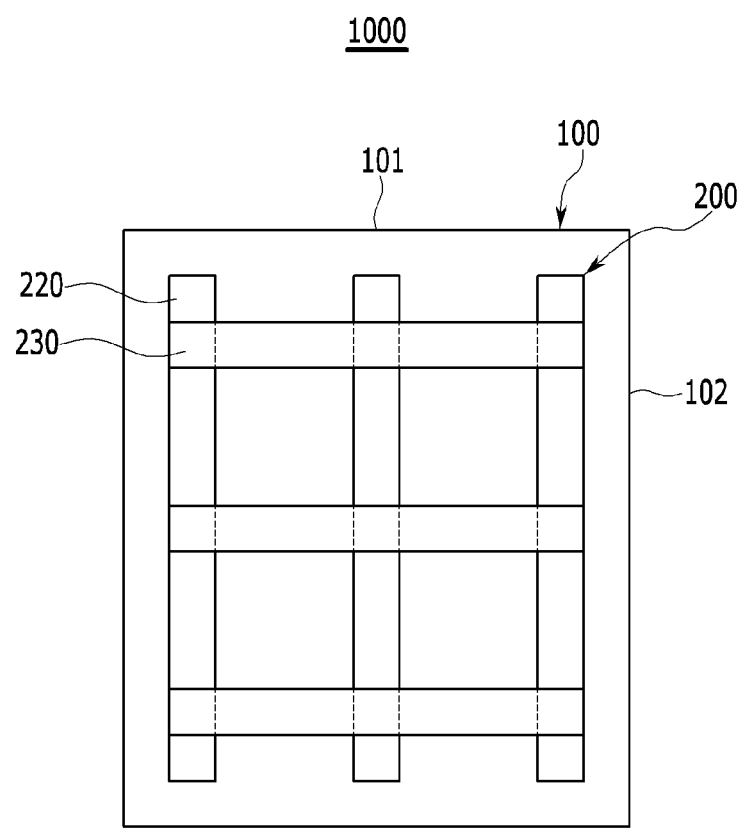
FIG. 7 is a schematic view showing an arrangement of a curvature change member according to another exemplary embodiment.

FIG. 7 is a schematic view showing an arrangement of curvature change members 220, 230 according to another exemplary embodiment.

Referring to FIG. 7, the curvature change member layer 200 includes the plurality of longitudinal curvature change members 220 and the plurality of transverse curvature change members 230.

The plurality of longitudinal curvature change members 220 are positioned to be separated from each other by a predetermined interval, and extend to be parallel to the extending of the long edge 102 of the flexible display panel 100. The plurality of transverse curvature change members 230 are positioned to be separated from each other by a predetermined interval, and extend to be parallel to the extending of the short edge 101 of the flexible display panel 100. The longitudinal curvature change members 220 and the transverse curvature change members 230 may be positioned at different layers. In the present exemplary embodiment, the transverse curvature change members 230 are positioned under the longitudinal curvature change members 220. However, it is not limited thereto, and the longitudinal curvature change members 220 may be positioned under the transverse curvature change members 230. Also, the transverse curvature change members 230 and the longitudinal curvature change members 220 may be positioned at the same layer.

Next, a method for controlling the curvature of the display device according to an exemplary embodiment will be described with reference to FIGS. 8, 9, and 10 together.

Figure 8:
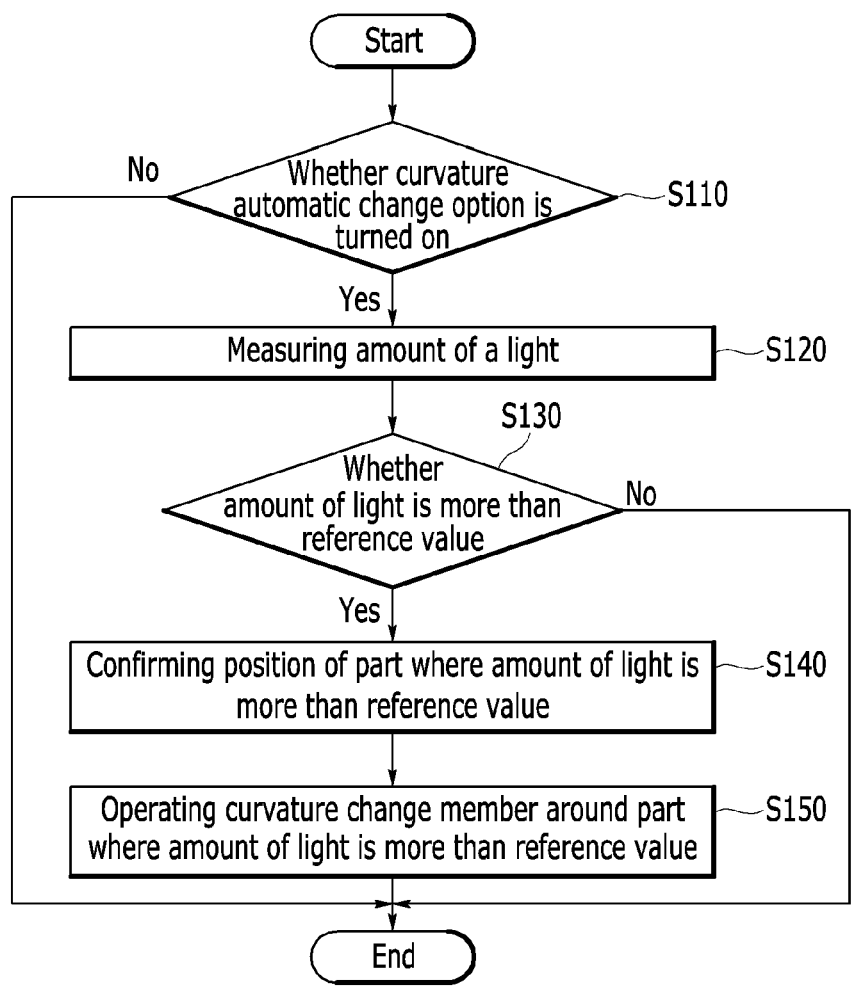
FIG. 8 is a flowchart schematically showing a method for controlling a curvature of a display device according to an exemplary embodiment.

FIG. 8 is a flowchart schematically showing a method for controlling a curvature of a display device according to an exemplary embodiment. In detail, the method for controlling the curvature of the display device preventing the glare of the consumer is schematically shown in the flowchart. FIG. 9 is a view showing an operation of confirming a position of a part at which an amount of incident light is more than a reference value in a control method of a curvature of the display device of FIG. 8. FIG. 10 is a view schematically showing a shape of a display device that is bent by controlling a curvature of a display device through a control method of a curvature of the display device of FIG. 8.

Figure 9:
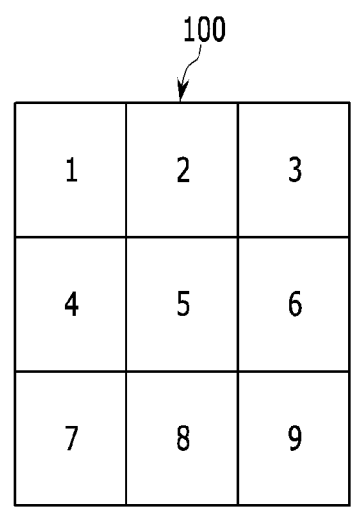
FIG. 9 is a view showing an operation of confirming a position of a part at which an amount of incident light is more than a reference value in a control method of a curvature of the display device of FIG. 8.
Figure 10:
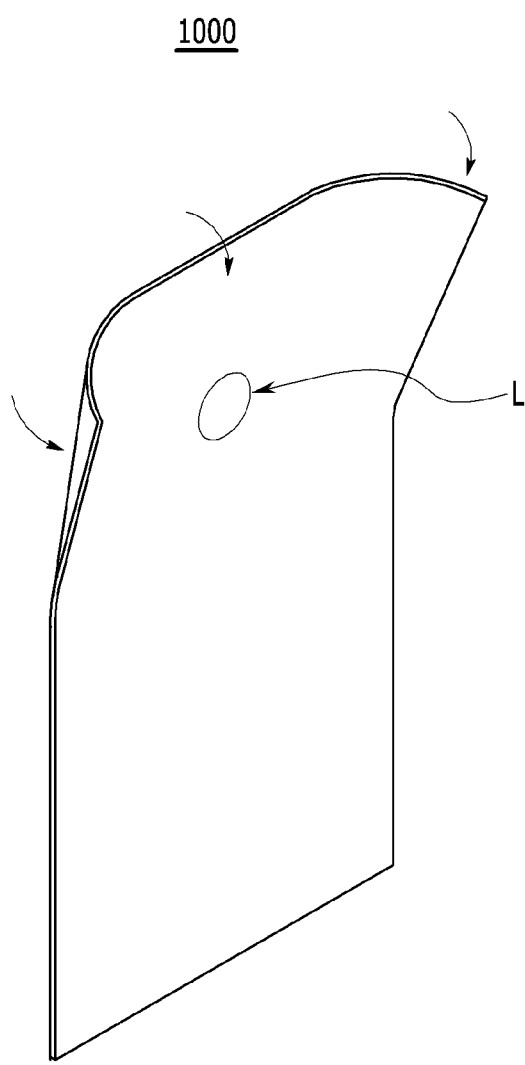
FIG. 10 is a view schematically showing a shape of a display device that is bent by controlling a curvature of a display device through a control method of a curvature of the display device of FIG. 8.

Referring to FIGS. 8, 9, and 10 together, first, it is confirmed whether a curvature automatic change option of the display device 1000 is turned on (operation S110).

Next, if the curvature automatic change option is turned on, the amount of light incident to the flexible display panel 100 is measured by using the photo sensor 510 (operation S120).

Next, it is determined whether the measured amount of light is more the reference value (operation S130). Here, the reference value may be selected a range 500 lx to 1000 lx.

Next, if the amount of measured light is more than the reference value, a position L of the part where the amount of incident light is more than the reference value is confirmed (operation S140).

The position of the part where the amount of incident light is more than the reference value is confirmed through a camera (not shown) included in the display device 1000. For example, as shown in FIG. 9, the flexible display panel 100 is divided into nine equal parts and a screen displayed in the flexible display panel 100 is captured to find a brightest portion L. Portion L is sometimes called the position L or the part L. Next, if the position of the part L where the amount of incident light is more than the reference value is confirmed, the curvature change member 210 positioned around the part L where the amount of incident light is more than the reference value is operated (operation S150). As shown in FIG. 10, the curvature change members 210 positioned at a left side, a right side, and an upper side of the brightest part L are contracted or elongated to bend the parts of the flexible display panel 100 at the left side, the right side, and the upper side of the brightest part L.

Accordingly, the amount of incident light is reduced by the bent parts or the incident angle of the incident light is changed such that the glare of the consumer caused by the incident light may be prevented.

The control method of the curvature of the display device according to another exemplary embodiment will be described with reference to FIG. 11.

Figure 11:
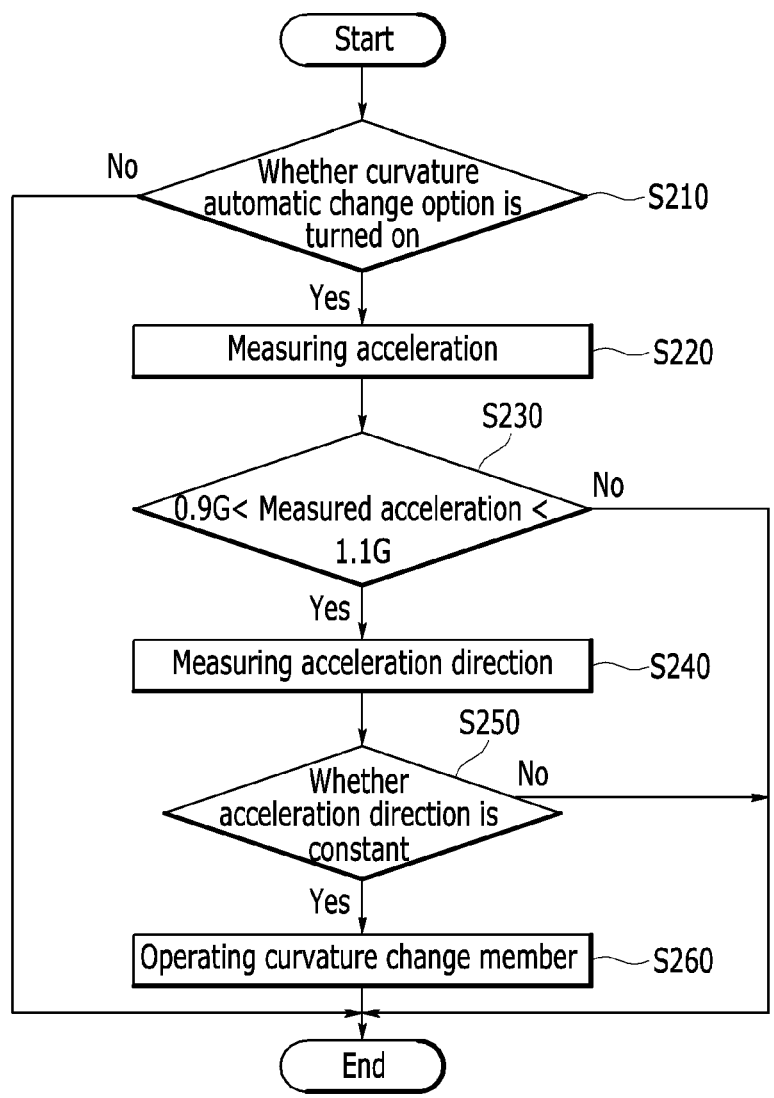
FIG. 11 is a flowchart schematically showing a method for controlling a curvature of a display device according to another exemplary embodiment.

FIG. 11 is a flowchart schematically showing a method for controlling a curvature of a display device according to another exemplary embodiment. In detail, the control method of the curvature of the display device to mitigate the impact when the free fall of the display device occurs is shown in the flowchart.

Referring to FIG. 11, first, it is confirmed whether the curvature automatic change option of the display device 1000 is turned on (operation S210).

Next, if the curvature automatic change option is turned on, the acceleration of the display device is measured by using the acceleration sensor 520 (operation S220).

Next, it is determined whether the measured acceleration is larger than 0.9 G and is smaller than 1.1 G (operation S230). Here, G represents gravitational acceleration.

Next, if the measured acceleration is larger than 0.9 G and is smaller than 1.1 G, an acceleration direction of the display device is measured (operation S240).

Next, it is determined whether the acceleration direction is constant (operation S250). In this case, it is determined whether the acceleration direction is constant during a predetermined time.

Next, if the acceleration direction is constant, the curvature change member 210 is operated (operation S260). In this case, the curvature change member 210 is contracted or elongated to bend the flexible display panel 100.

If the measured acceleration is larger than 0.9 G and is smaller than 1.1 G, the measured acceleration is a value that is similar to gravitational acceleration, and if the acceleration direction is constant during the predetermined time, it may be determined that the display device 1000 free falls. Accordingly, when the free fall of the display device 1000 occurs, the curvature change member 210 is contracted or elongated to bend the entire flexible display panel 100, thereby mitigating the impact.

The control method of the curvature of the display device according to another exemplary embodiment will be described with reference to FIG. 12.

Figure 12:
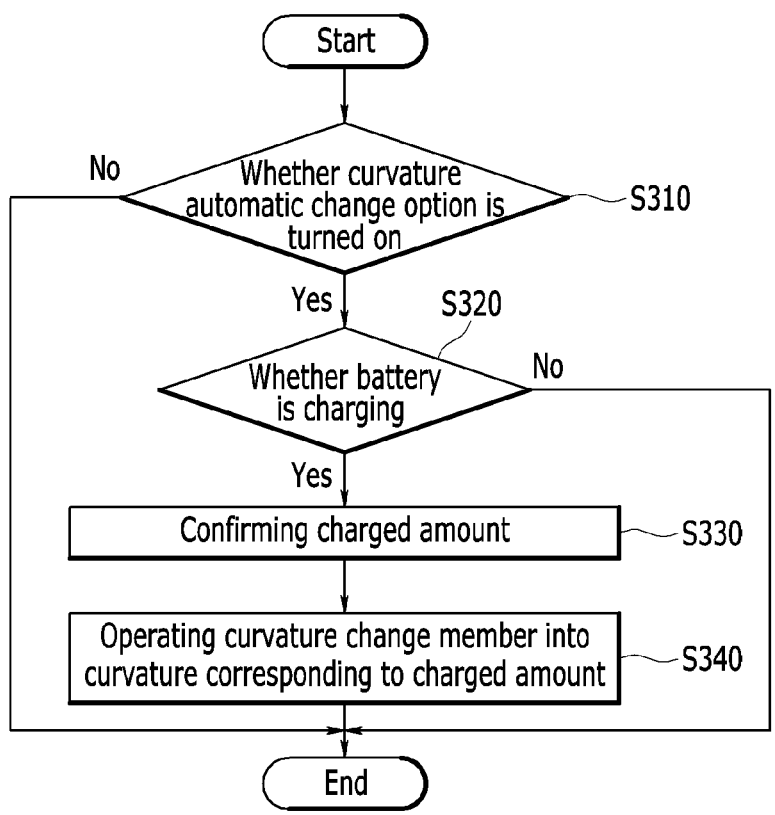
FIG. 12 is a flowchart schematically showing a method for controlling a curvature of a display device according to another exemplary embodiment.

FIG. 12 is a flowchart schematically showing a method for controlling a curvature of a display device according to another exemplary embodiment. In detail, the control method of the curvature of the display device depending on a battery charge amount of the display device is shown in the flowchart.

Referring to FIG. 12, first, it is confirmed whether the curvature automatic change option of the display device 1000 is turned on (operation S310).

Next, if the curvature automatic change option is turned on, it is determined whether a battery of the display device 1000 is charging (operation S320).

Next, if the battery is changing, the charged amount is confirmed (operation S330).

Next, the curvature change member 210 is operated with a curvature radius corresponding to the charged amount of the battery (operation S340). As the curvature radius corresponding to the charged amount of the battery, for example, if the charged amount of the battery is 50%, the curvature radius is 500 cm, if the charged amount is 60%, the curvature radius is 600 cm, and if the charged amount is 100%, it is a plane. That is, if the charged amount of the battery is 50%, the curvature change member 210 is contracted or elongated for the curvature radius of the display device 1000 to be 500 cm. Also, if the charged amount of the battery is 60%, the curvature change member 210 is contracted or elongated for the curvature radius of the display device 1000 to be 600 cm. Also, if the charged amount of the battery is 100%, the curvature change member 210 is not operated.

Accordingly, by changing the curvature of the display device 1000, the charge state of the battery may be confirmed.

The control method of the curvature of the display device according to another exemplary embodiment will be described with reference to FIG. 13.

Figure 13:
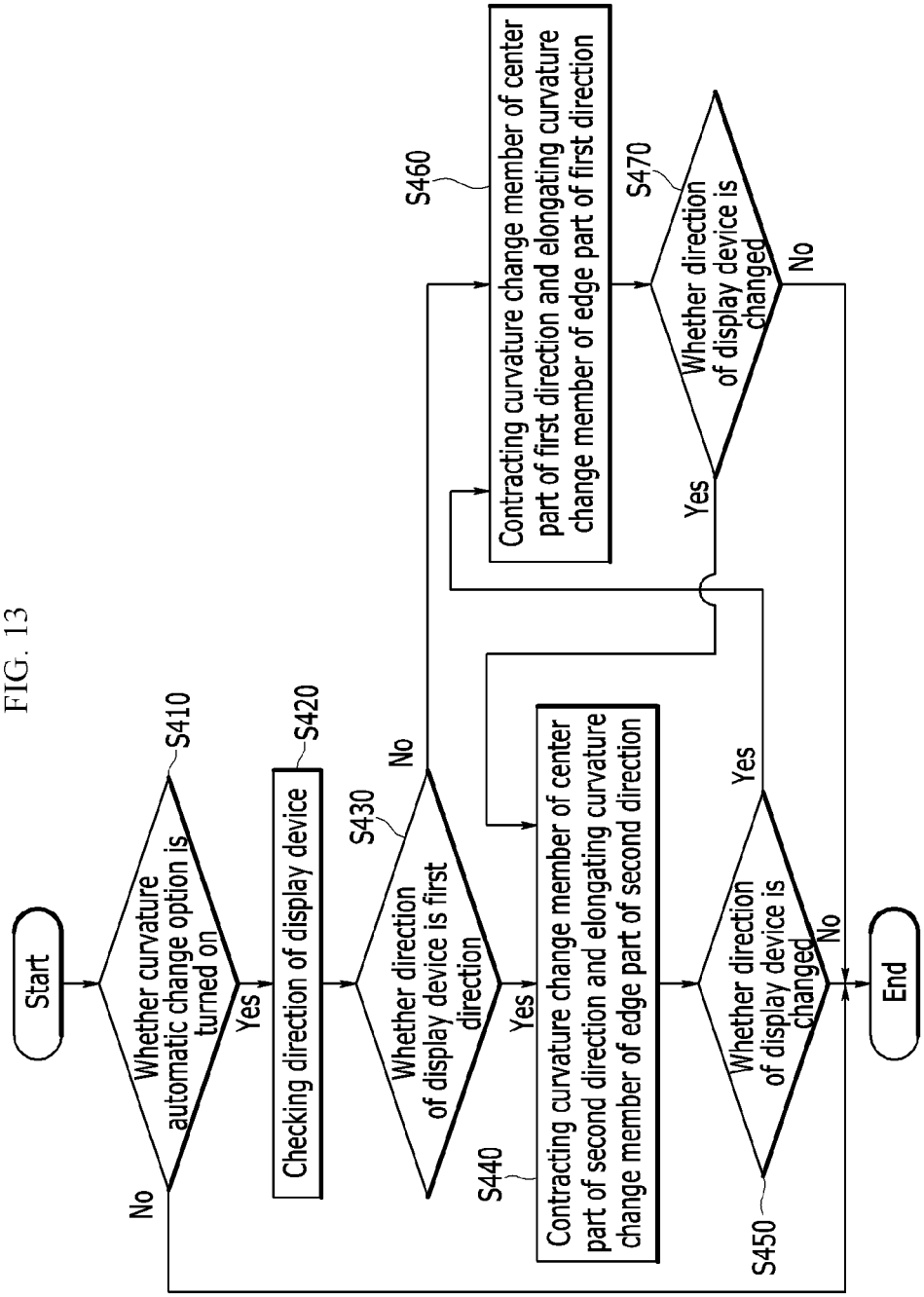
FIG. 13 is a flowchart schematically showing a method for controlling a curvature of a display device according to another exemplary embodiment.
Figure 14:
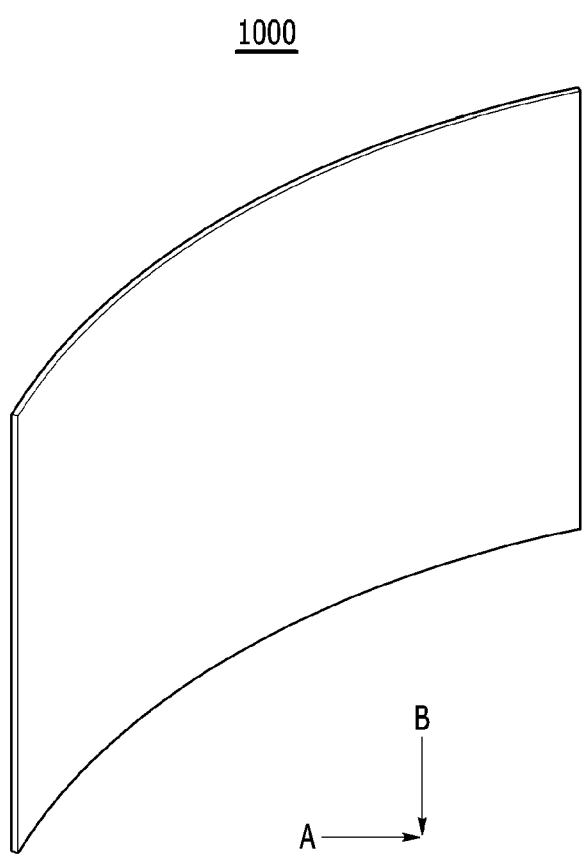
FIG. 14 and FIG. 15 are views schematically showing a shape of a display device that is bent by controlling a curvature of a display device through a controlling method of a curvature of the display device of FIG. 13.
Figure 15:
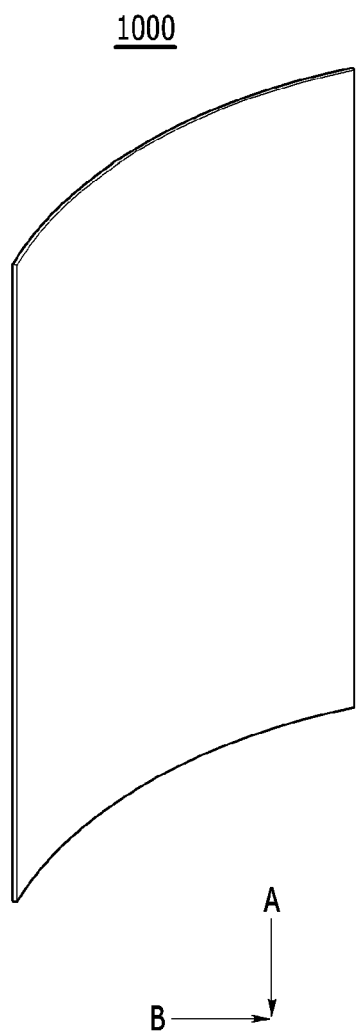

FIG. 13 is a flowchart schematically showing a method for controlling a curvature of a display device according to another exemplary embodiment. In detail, the control method of the curvature of the display device depending on a battery charge amount of the display device is shown in the flowchart. FIG. 14 and FIG. 15 are views schematically showing a shape of a display device that is bent by controlling a curvature of a display device through a controlling method of a curvature of the display device of FIG. 13.

Referring to FIGS. 13, 14, and 15 together, first, it is confirmed whether the curvature automatic change option of the display device 1000 is turned on (operation S410).

Next, if the curvature automatic change option is turned on, the direction of the display device 1000 is confirmed (operation S420). In this case, it is confirmed whether the screen displayed by the display device 1000 is parallel to the first direction A as the extending direction of the long edge of the flexible display panel 100 or the second direction B as the extending direction of the short edge of the flexible display panel 100. Here, when the screen displayed by the display device 1000 is parallel to the first direction A, the direction of the display device 1000 is referred to as the first direction A, and when the screen displayed by the display device 1000 is parallel to the second direction B, the direction of the display device 1000 is referred to as the second direction B.

Next, it is determined whether the direction of the display device 1000 is the first direction A (operation S430).

Next, if the direction of the display device 1000 is the first direction A, the curvature change member 210 positioned at the center part of the second direction B is contracted, and the curvature change member 210 of the edge part of the second direction B is elongated, as shown in FIG. 14, to bend the flexible display panel 100 based on the axis parallel to the second direction B (operation S440).

Next, it is confirmed whether the direction of the display device is changed (operation S450).

Meanwhile, if the direction of the display device 1000 is not the first direction A but is the second direction B, the curvature change member 210 positioned at the center part of the first direction A is contracted, and the curvature change member 210 of the edge part of the first direction A is elongated, as shown in FIG. 15, to bend the flexible display panel 100 based on the axis parallel to the first direction B (operation S460).

Next, it is confirmed whether the direction of the display device is changed (operation S470).

Meanwhile, in the operation S450, if the direction of the display device is changed, that is, the direction of the display device is changed from the first direction A to the second direction B, the operation S460 is executed.

Meanwhile, in the operation S470, if the direction of the display device is changed, that is, if the direction of the display device is changed from the second direction B to the first direction A, the operation S440 is executed.

Accordingly, because the flexible display panel 100 may be bent along with the direction of the display device 1000, immersion of the consumer for the screen may be improved.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

DESCRIPTION OF SYMBOLS

100: flexible display panel
200: curvature change member layer
210: curvature change member
220: longitudinal curvature change member
230: transverse curvature change member
300: supporting member
400: controller
500: sensor unit

What is claimed is:

1. A method for controlling a curvature of a display device including a flexible display panel, a curvature change member, a controller, and an acceleration sensor, comprising:
   measuring acceleration of the display device by using an acceleration sensor;
   measuring an acceleration direction of the display device when the measured acceleration of the display device is larger than 0.9 G and is smaller than 1.1 G;
   changing the curvature of the flexible display panel by using the curvature change member if the acceleration direction of the display device is constant during a predetermined time;
   confirming whether a battery of the display device is charging;
   confirming a charged amount if the battery of the display device is charging; and
   changing the curvature of the flexible display panel into a curvature corresponding to the charged amount by using the curvature change member.

2. The method of claim 1, wherein
the curvature change member is disposed under the flexible display panel, and
a contraction and an elongation of the curvature change member are controlled in the controller.

3. The method of claim 2, wherein
the curvature change member is in plural, and
the controller controls each contraction and each elongation of the plurality of curvature change members.

* * * * *